(No Model.) 2 Sheets—Sheet 1.
A. D. COPLIN.
HOSE REEL.
No. 486,692. Patented Nov. 22, 1892.
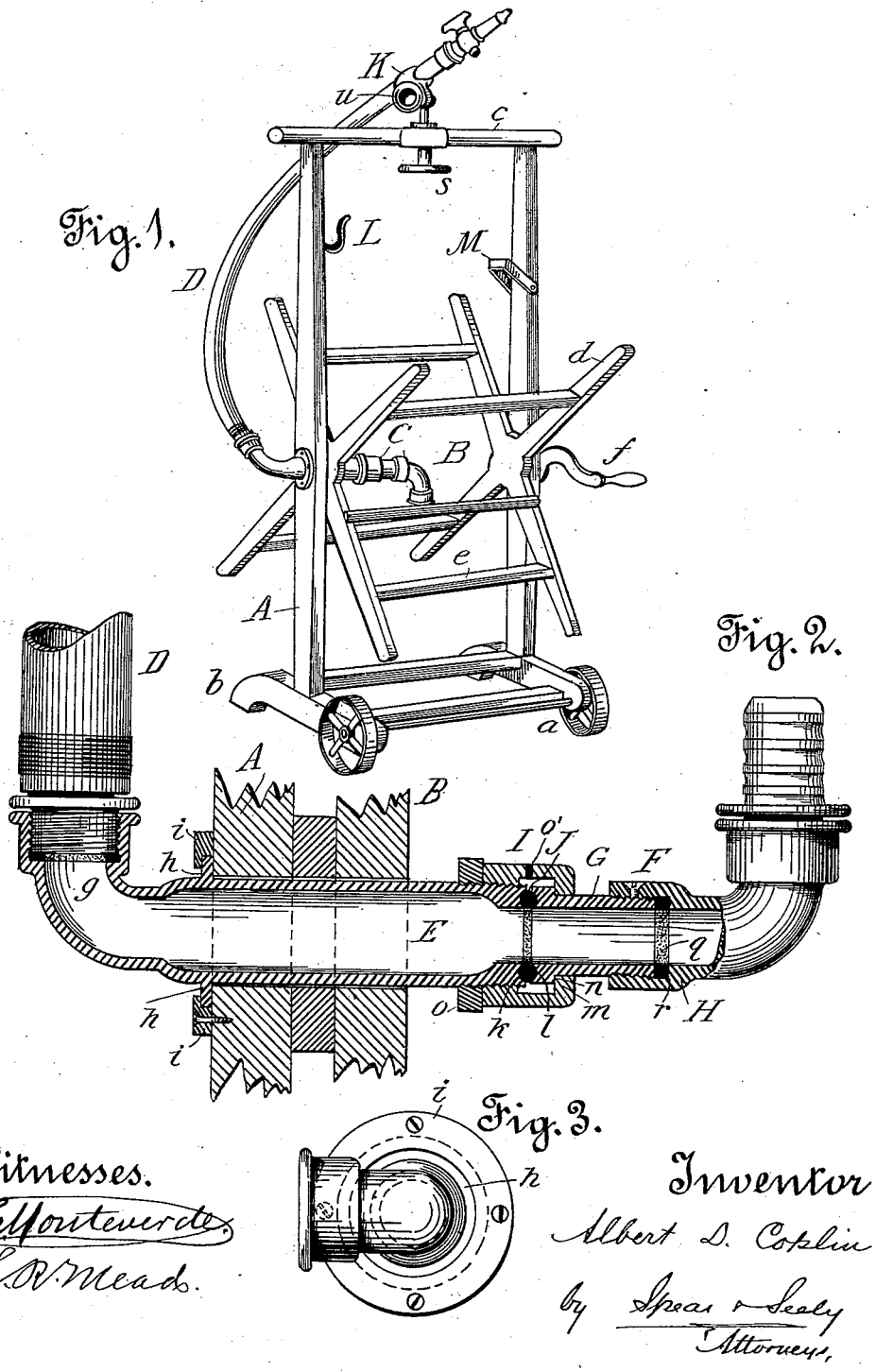
Witnesses.
F. E. Monteverde
L. W. Mead.
Inventor
Albert D. Coplin
by Spear & Seely
Attorneys.

(No Model.) 2 Sheets—Sheet 2.

A. D. COPLIN.
HOSE REEL.

No. 486,692. Patented Nov. 22, 1892.

Witnesses.
H. E. Monteverde
L. A. Mead

Inventor.
Albert D. Coplin
by Spear & Seely
Attorneys

UNITED STATES PATENT OFFICE.

ALBERT D. COPLIN, OF OAKLAND, CALIFORNIA.

HOSE-REEL.

SPECIFICATION forming part of Letters Patent No. 486,692, dated November 22, 1892.

Application filed June 24, 1891. Serial No. 397,345. (No model.)

*To all whom it may concern:*

Be it known that I, ALBERT D. COPLIN, a citizen of the United States, and a resident of Oakland, in the county of Alameda, State of California, have invented certain new and useful Improvements in Hose-Reels; and I do hereby declare that the following is a full, clear, and exact description of the same.

This invention relates to improvements in hose-reels.

The invention is more particularly adapted to portable reels employed in watering lawns, gardens, &c., but is also applicable to other kinds of reels, such as those used to carry fire-hose in buildings.

Figure 4:
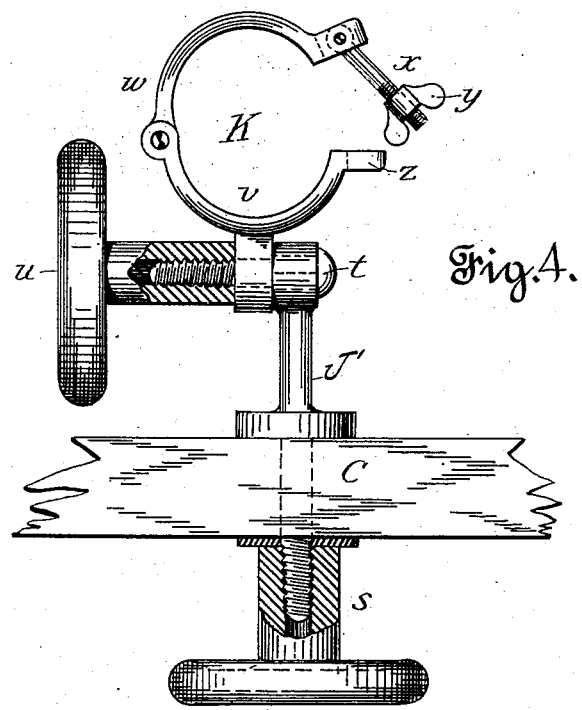
Figure 5:
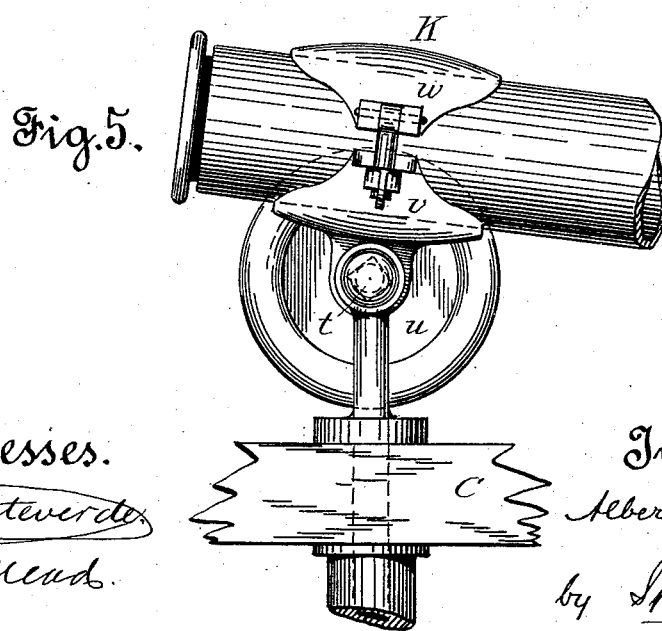

In the drawings, Figure 1 is a perspective view of the reel. Fig. 2 is a longitudinal section of the hollow axle. Figs. 3, 4, and 5 are detail views of the adjustable support for the discharge end of the hose.

A represents the supporting-frame of the reel, preferably of rectangular shape and having at the bottom wheels $a$ and feet $b$, which support it in a vertical position. The upper cross-bar $c$ of the frame forms handles to be grasped in transporting the reel from place to place.

B is the reel proper, composed of radial arms $d$ and cross-pieces $e$, connecting them. The reel is journaled in the frame so as to rotate freely. One side is provided with a journal projecting through the frame and having on its squared end a crank-handle $f$, by means of which the hose may be wound upon the reel. The other side of the reel is journaled and turns freely upon the hollow axle C, which projects through the frame, as shown in Fig. 1. The construction of this axle, which forms the intermediate connection between the main hose and the short length D which carries the discharge-nozzle, is fully illustrated in the sectional view Fig. 2.

E is a tubular section projecting through the frame of the reel and having a threaded elbow $g$, to which the short piece of hose D is coupled. A flange $h$ abuts against the frame of the reel, and is held in place by and turns within a stationary flanged ring $i$, secured to the frame by screws or otherwise. The tubular section E forms the journal upon which the reel revolves.

The inner end section F of the axle C, to which the main hose is attached, is connected to the section E by a rotary water-tight joint, which permits such end to turn with the reel when the hose is wound upon the reel, and yet prevents any leakage of water. The part F is really composed of two tubular sections G and H firmly secured together, as hereinafter explained. The section G is connected to the part E by a collar I, adjustable upon the threaded inner end of the section E.

J is the packing-ring of rubber, which is held in circular recesses $k$ $l$, formed in the abutting ends of the tubes E and G, respectively.

The collar I has a flange $m$, which is caused to bear upon a shoulder $n$ on the tube G. The rubber ring is thus put under pressure and expanded, so as to fill the space between the parts E and G and make a water-tight joint, while at the same time the end section F can turn freely in the collar. The flange $m$ and shoulder $n$ afford another and external joint and give additional security against leakage. A nut $o$ locks the collar in place when the parts are properly adjusted. The collar may have an oil-hole $o'$, as shown.

As before stated, the parts G and H form practically one tube; but it is necessary in putting the axle in place to fit the collar I in position before the enlarged end to which the main hose is attachd. The section H is therefore screwed onto the end of part G after the collar has been fitted, and then rigidly secured by white lead or solder or by screws $p$. A packing-ring $q$ is also inserted and compressed between the end of section G and a shoulder $r$ on section H.

The main hose is connected to the inner end of the axle and then wound upon the reel, from which as much of it may be run off as may be required for use. The hose D having the the discharge-nozzle connected to the outwardly-projecting end of the axle, the rotary joint of the axle permits the hose to be used in all directions without kinking or bending near the coupling, as is always the case where rigid stationary axles are used.

I have devised an attachment for use with garden and lawn hose, by means of which the discharge end of the hose may be adjusted to any angle and held there while in use. This is illustrated in detail in Fig. 4. J' represents a standard pivoted in the handle or cross-bar of the reel-frame and adapted to be clamped in place by a nut $s$ on its threaded end. A screw-bolt $t$ passes horizontally through a hole in the standard, and upon such bolt is pivoted an adjustable clamp K, which may be turned to any angle of elevation or depression and held at such angle by a nut $u$. The clamp is composed of a fixed jaw $v$ and a hinged jaw $w$, half-round in shape and adapted to receive the hose between them. The jaws are fastened on the hose by means of a screw $x$, pivoted in a slot in the hinged jaw and having a set-nut $y$. In fastening the hose the screw is brought down into engagement with a slot $z$ in the fixed jaw and the nut turned up against the jaw, locking the jaws together. This construction allows a universal adjustment of the hose-nozzle horizontally and vertically to all angles while it is in use, and the shape of the clamps prevents any injury to the hose itself.

L represents a bracket secured to the reel-frame for holding the end of the main hose when wound on the reel and disconnected from the water-supply, and M is a pivoted lock adapted to fit over one of the arms of the reel and hold it stationary when desired.

Having described my invention, I claim—

The combination, with the frame of the reel, of a hollow axle composed of sections E and F, connected together by a rotary joint, flange $h$ on the section E, and a stationary ring $i$, secured to the frame and forming a bearing for said flange $h$, substantially as described.

In testimony whereof I have hereunto affixed my signature, in the presence of two witnesses, this 15th day of June, 1891.

ALBERT D. COPLIN.

Witnesses:
L. W. SEELY,
H. J. LANG.